United States Patent [19]

Barton et al.

[11] 3,955,419

[45] May 11, 1976

[54] MULTIPLE SENSOR TEMPERATURE MEASURING DEVICE

[75] Inventors: Serge P. Barton, Wallingford; Louis Sangiorgio, Broomall, both of Pa.

[73] Assignee: Westinghouse Electric Corporation, Pittsburgh, Pa.

[22] Filed: June 20, 1974

[21] Appl. No.: 481,269

[52] U.S. Cl.................................. 73/340; 73/341; 73/342; 73/343 R; 136/221; 338/28
[51] Int. Cl.² ..................... G01K 1/14; G01K 7/00
[58] Field of Search.......... 73/340, 341, 342, 343 R, 73/349, 351; 136/221, 229, 230, 233; 338/28, 30

[56] References Cited
UNITED STATES PATENTS

| | | | |
|---|---|---|---|
| 3,022,670 | 2/1962 | Sutliffe................................ | 73/349 X |
| 3,656,914 | 4/1972 | Friedrichsen et al............. | 73/341 X |
| 3,874,232 | 4/1975 | Hardison............................ | 73/342 X |

FOREIGN PATENTS OR APPLICATIONS 193,120   3/1967   U.S.S.R................................. 73/341

Primary Examiner—James J. Gill
Assistant Examiner—Frederick Shoon
Attorney, Agent, or Firm—G. H. Telfer

[57] ABSTRACT

A multiple sensor temperature measuring device for measuring temperatures at a predetermined number of points along a line of investigation within a body is described. The device has a plurality of temperature sensors mounted on a corresponding plurality of expandable mounting members, each sensor being surrounded by electrical insulation and being contained within a protective sheath. The mounting members are expanded by suitable spacers to dispose the sheath in an abutting and temperature sensing relationship with the body at each predetermined point of interest therein.

11 Claims, 2 Drawing Figures

MULTIPLE SENSOR TEMPERATURE MEASURING DEVICE

BACKGROUND OF THE INVENTION

1. Field of the Invention

This invention relates to temperature measuring devices, and in particular, to a temperature measuring device having a plurality of sensors therein.

2. Descriptionof of the Prior Art

As is well known to those skilled in the art of temperature measurement, there are times when it is necessary to measure the temperature at several predetermined points along a predetermined line of investigation leading to the interior of a body, for example, a steam turbine pressure containment vessel. Such investigation may be needed in order to determine the radial temperature distribution within the turbine pressure vessel, and, it is therefore necessary to measure the temperature within the casing at several points along the line of investigation. Frequently, the temperature variation along the line of investigation is accompanied by variations in the other direction surrounding that predetermined line. For example, when measuring the radial temperature distribution, it is found that the radial variation in temperature is often accompanied by axial and circumferential variations as well. Because of these gradients in temperature, it is necessary to confine the measurement to a very localized region surrounding the line of interest. In addition, the measuring devices themselves must not introduce appreciable disturbances to the basic temperature field. For example, the devices must not introduce large empty cavities within the body which tend to distort the temperature fields therein. Also, the measuring device utilized must be placed in an intimate, temperature sensing relationship with the body to be measured.

In the prior art, the most common solution to the above described problem has been to produce several individual holes of varying depth around the particular line of investigation, and to insert a separate temperature measuring device into each hole in order to measure the temperature at the bottom of each cavity. These individual readings, although they are somewhat displaced from the particular line of investigation, are considered estimates of the actual temperatues along that line.

This solution is unsatisfactory for several reasons. If appreciable temperature gradients exist around the line of interest, misleading temperature readings are obtained. Also, there are certain situations when it would be undesirable to introduce multiple cavities into the body being measured. For example, it may be undesirable to place a number of varying depth holes into a pressure vessel for a turbine apparatus since such holes tend to weaken the pressure vessel.

Another solution to the problem of measuring temperatures at a predetermined number of points along a line of investigation has been to prepare a single cavity extending into the interior of the body and to weld small flexible shims containing thermocouple elements to the boundary of the cavity at each point where the temperature is desired. In addition to the obvious difficulty and special skill and equipment required to effect this method of attachment, the operation produces weld effects which may be undesirable. Also, considerable distortion results in the thermal field because a fairly large cavity within the body member is left unfilled except for the shims and the sheath wires. In addition, the thermocouple wires are electrically grounded to the body member being measured and thus the possibility of spurious readings occurring due to extraneous electrical currents is increased.

It is apparent that a temperature measuring device able to accurately sense temperature at a predetermined number of points along a single line of investigation within a body member is needed. Further, a temperature measuring device which can make the plurality of required readings without introducing large void spaces within the body to disrupt the thermal field therein and which places the sensing elements in intimate temperature sensing relationships with the body is necessary.

SUMMARY OF THE INVENTION

A temperature measuring device for measuring temperatures at a predetermined number of points along a predetermined line of investigation within a body member is disclosed. The temperature measuring device comprises a plurality of temperature sensing heads, each head comprising a temperature sensing element mounted on an expandable mounting member. Each temperature sensing element, in turn, contains a temperature sensor surrounded by electrical insulation and protected by a metallic sheath fastened to the exterior surface of the mounting member. The sensor comprising either a thermocouple juncton, a resistance temperature detector, or other suitable apparatus, is electrically insulated from the body member.

The number of temperature sensing heads correspond to the number of predetermined points at which temperature readings are sought. Further, suitable means for expanding each of the mounting members so as to dispose each of the temperature sensing elements in an abutting and temperature sensing relationship with the body are provided. The mounting members are split annular rings each of which overlap a spacer member at one end thereof and abut either an adjacent spacer member or a plug member at the opposite end thereof. Transmission of force along the axis of the temperature measuring device causes the expandable members to be axially displaced in a direction tending to overlap a greater portion of the spacer element. Greater overlap of the spacer element in response to the force directed along the axis of the temperature measuring device causes the mounting members to expand and to bring th temperature sensing elements mounted on the exterior surface thereof into an abutting and temperature-sensing relationship with the body member. The sheath, extending from each of the plurality of temperature sensing heads, extends through a central axial cavity within the temperature measuring device to suitable monitoring means.

It is an object of this invention to provide a temperature measuring device having a plurality of sensing heads thereon able to accurately measure temperatures at a predetermined number of points lying along a predetermined line of investigation within a body member. It is a further object of this invention to dispose a temperature measuring device wherein each of the sensing elements is disposed along the line of investigation and in intimate contact with the body to be measured. It is a further object of this invention to provide a temperature measuring device which does not result in large void spaces being disposed within the body member so as to avoid distortions of the thermal field sought to be measured. It is yet another object of this invention to provide a temperature measuring device wherein the temperature sensor is electrically isolated from the body being measured to prevent spurious readings due to extraneous electrical currents. Other objects of this invention will be made clear in the detailed description of the preferred embodiment which follows herein.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENTS

Figure 1:
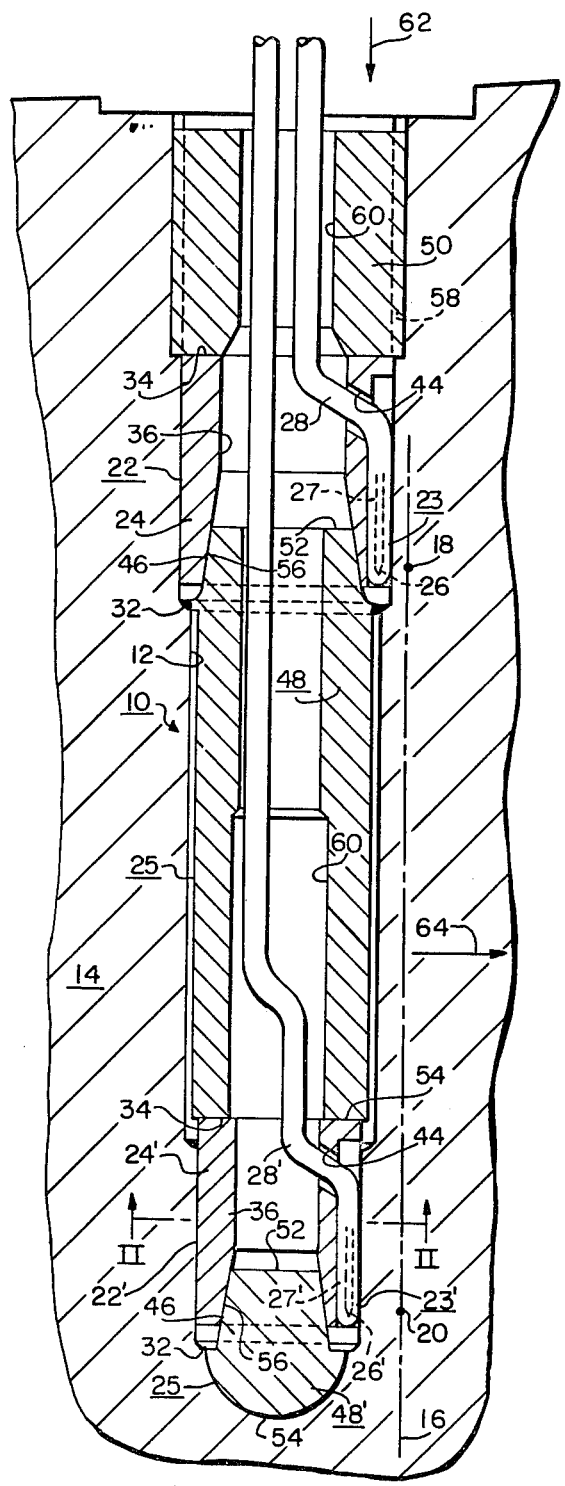
FIG. 1 is an elevational view substantially in section of a temperature measuring device having a plurality of sensing heads therein taught by this invention; and, FIG. 2 is a sectional view taken along section line II—II of FIG. 1.

Throughout the following description, similar reference characters refer to similar elements in all Figures of the drawings.

Referring to FIG. 1, an elevational view, substantially in section, of a temperature measuring device generally indicated at reference numeral 10 is shown. The temperature measuring device 10 embodies the teachings of this invention and is illustrated as disposed within a bore 12 provided within a body member 14. The body member 14 can be any member the temperature of which at several points therein is of interest. For example, the body 14 may be the high pressure casing for an axial flow turbine apparatus. It is often necessary in the steam turbine art to accurately ascertain the temperature of the body 14 at different points which lie along a predetermined line of investigation within the body 14.

In FIG. 1, it is noted that the axis of the bore 12 is parallel to and displaced from a predetermined line of investigation 16 within the body 14 and the temperatures of the body 14 at several preselected points of interest, such as points 18 and 20 which lie along the line of interest 16, are to value to those engaged in the art of steam power generation. It is for this purpose, to measure the temperature of a predetermined number of points lying along a predetermined line of investigation within a body member, that the temperature measuring device 10 is provided within the bore 12. It is to be noted that although the axis of the device 10 is coincident with the axis of the bore 12, the disposition of the bore 12 within the body 14 is dependent only upon the disposition of the line of interest 16 within th body 14. Thus, the orientation of the line of interest 16 within the body 14 relative to some other given reference axis (such as the axis of the turbine element) is immaterial to the description of the temperature measuring device 10. It is only relevant that the temperature measuring device 10 be disposed within a bore 12 within the body member 14 in such a manner so that the temperatures of a predetermined number of points which lie along a predetermined line of investigation 16 may be determined. It is also to be noted that although FIG. 1 illustrates two of such points of interest 18 and 20, the temperature of any predetermined number of points lying along the predetermined line of investigation may be determined through the use of a temperature measuring device 10 embodying the teaching of this invention. In the description that follows, it is understood that reference will be made to only a sufficient number of elements of the temperature measuring device 10 that will provide temperature readings for the points 18 and 20.

In the prior art, various techniques for obtaining the temperature of several predetermined points are available, but all had serious shortcomings. The most common solution is to produce several individual holes of varying depths arranged aroung the line of interest and to dispose in each hole a separate thermocouple device. Thus, each thermocouple device indicates a temperature at the bottom of each different hole. These individual readings are recorded, but are considered to provide, at best, an estimate of the actual temperatures at various points along the line of interest. Since each recorded temperature is appreciably removed from the line of interest, the values recorded may be misleading if there exist appreciable temperature gradients around the line of interest. Also, it may be structurally undesirable to introduce a multiplicity of cavities in the body whose temperatures is measured.

Another prior art solution involves preparation of a single hole leading into the body along the line of interest. A plurality of small flexible shims, containing the thermocouple junction, are then welded to the boundary of the hole at each point where the temperature is desired. In addition to the high cost involved in the difficult method of attachment, considerable distortion in the thermal field occurs because a fairly large cavity is left unfilled except for the shims and the thermocouple wires. Also, the thermocouple wires are electrically grounded to the body being measured, leading to the possiblity of spurious readings being measured due to extraneous electrical currents.

A temperature measuring device 10 embodying the teachings of this invention eliminates these disadvantages of the prior art.

In general, the temperature measuring device 10 for measuring the temperatures at a predetermined number of points along a predetermined line of investigation within a body member comprises a plurality of temperature sensing heads, generally indicated at reference numerals 22 and 22'. The temperature sensing heads 22 and 22' are comprised of a plurality of temperature sensing elements, 23 and 23', each element 23 and 23' being disposed on the external surface of and at one end of a corresponding plurality of expandable mounting members 24 and 24'. The number of temperature sensing elements 23 and 23', and associated expandable mounting members 24 and 24', of course, corresponds to the number of preselected points of interest along the predetermined line of investigation 16 whose temperature is sought. Since only the temperature of points 18 and 20 along the line of interest 16 is sought, only the two sensing heads 22 and 22' (each comprising the sensing elements 23 and 24' mounted on the expandable mounting members 24 and 24') are provided. The temperature measuring device 10 further comprises means, generally indicated at 25, for expanding the expandable mounting members 24 and 24' so as to dispose the temperature sensing elements 23 and 23' in abutting and temperature sensing relationships with the body 14.

Each temperature sensing element 23 and 23' itself comprises a temperature sensor 26 and 26' surrounded by electrical insulation 27 and 27' and disposed within a protective metallic sheath 28 and 28', respectively.

The temperature sensors 26 and 26' can be any apparatus which is able to accurately sense temperature levels, such as a thermocouple junction or a resistance-temperature detector. In FIG. 1, the temperature sensors 26 and 26' are each a thermocouple junction, although it is to be understood that any suitable temperature detector may be utilized as the temperature sensor. Hereinafter, the reference numerals 26 and 26' will more specifically refer to a thermocouple junction, which in the particular embodiment shown, serves as the temperature sensor.

As is well known to those skilled in the thermocouple art, each of the thermocouple sensors 26 and 26' contain a juncton of dissimilar metallic wires fabricated, for example, from Chromel and from Constantan. The dissimilar metallic wires are joined at one end to form the bimetallic junction while the opposite ends are connected to an external electrical circuit (not shown). The voltage developed in the electrical circuit is dependent upon the temperature of the bimetallic junction. By measuring the voltage in the circuit, the temperature of the bimetallic junction, and therefore, the temperature of the body member, against which the element is disposed in a temperature sensing relationship, may be accurately ascertained.

As seen in FIG. 1, as is stated above, each of the thermocouple junction sensors 26 and 26' are surrounded, respectively, by the electrical insulation 27 and 27' and are encased within the metallic sheaths 28 and 28'. Each sheath 28 and 28' is fabricated from a rugged material compatible with the body 14. The thermocouple junction sensors 26 and 26' are electrically isolated from the sheaths 28 and 28' and from the body 14. The thermocouple junction sensors 26 and 26' are, therefore, isolated from any extraneous electrical currents which may be present. Thus, the temperature readings obtained by the thermocouple junction sensors 26 and 26', when placed in a temperature sensing relationship with the points 18 and 20, respectively, are not distorted by the presence of extraneous currents.

Figure 2:
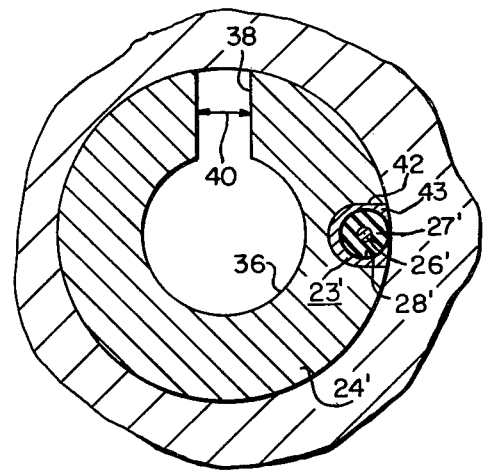

Referring to FIGS. 1 and 2, each of the expandable mounting members 24 and 24' is a substantially cylindrical member, preferably fabricated of the same material as the body 14 (although other material may be used) and having a first end 32 and a second end 34. Because of the orientation of the device in FIG. 1, for convenience, the first end 32 will be designated the lower end while the second end 34 will be designated the upper end of the expandable mounting members 24 and 24'. Each of the expandable mounting members 24 and 24' have a central axial cavity 36 extending therethrough, and a slit 38 (FIG. 2) extending completely along the axial length of each of the mounting members 24 and 24'. A gap 40 (FIG. 2) is disposed between the edges of the slit 38. It may be appreciated that the slit 38 enables the expandable mounting members 24 and 24' to respond by expanding to a force imposed thereon by the means 25. This expansion response of the expandable mounting members 24 and 24' will be described more fully herein.

Each of the expandable mounting members 24 and 24' have a groove 42 disposed on the external surface thereof near the lower end 32. As seen in the Figures, the sheaths 28 and 28' are fixedly attached, by suitable means, such as a high temperage braze 43 within the grooves 42 to dispose the temperatue sensing elements 22 and 22' (having the thermocouple junction sensors 26 and 26' therein on the exterior surface of the expandable mounting members 24 and 24' near one end thereof. A substantially radial slot 44 is provided in each of the expandable mounting members 24 and 24' and it is through the slots 44 that the sheaths 28 and 28' are conducted from the groove 42 on the exterior surface to the cavity 36 on the interior surface of the expandable mounting members 24 and 24'. Disposed about the interior surface of each of the expandable mounting members 24 and 24' is a sloped, frustoconical surface 46. The frustoconical surfaces 46 interact with the means 25 to expand the mounting members 24 and 24' to dispose the temperature sensing elements 22 and 22' in a temperature sensing relationship with the body 14 at points 18 and 20, respectively. This interaction will be more fully described herein.

The means 25 for expanding the expandable mounting members 24 and 24' comprise a plurality of spacer members 48 and 48' and a force-applying plug 50. Both the spacer members 48 and 48' have a first, or upper end 52 and a second, or lower end 54 thereon. The upper ends 52 of the spacers 48 and 48' have a frustoconical surface 56 thereon. The spacers 48 and 48' are disposed so that the lower ends 32 of the expandable mounting members 24 ans 24' slidably overlap a predetermined portion of the upper ends 52 of the spacer members 48 and 48'. Thus, as seen in FIG. 1, overlapping the ends of the spacers 48 and 48' by the expandable mounting members 24 and 24' dispose the frustoconical surfaces 56 on the former in a direct abutting relationship with the frustoconical surface 46 on the latter. In general, the lower ends 54 of the spaceers abut axially the upper ends of the expandable mounting members. Since, however, FIG. 1 shows only two expandable mounting members 24 and 24', only the spacer 48 is illustrated as having its upper end 52 overlapped by the mounting member 24, and its lower end 54 abutting against the next axially adjacent expandable mounting member 24'. Of course, if a greater number of expandable mounting members were provided, more spacers would exhibit the overlapped-abutting relationship between the spacer and the mounting members axially adjacent thereto. In general, however, the lower end 54 of the lowest spacer, spacer 48' in FIG. 1, always abuts against the bottom of the bore 12 provided in the casing 14. It is to be understood that although the lower spacer 48' in FIG. 1 exhibits a rounded tip configuration, any suitable shape may be provided. Also, generally speaking, the force-applying plug 50 always will abut against the uppermost expandable mounting member, member 24 in FIG. 1. It is also to be understood that although the plug 50 is secured within the bore 12 by a series of interlocking threads 58, any suitable attachment may be provided consonant with the function of the expanding means 5 to be described. The expanding means 25, including the spacer 48 and the plug 50, have a central bore 60 extending therethrough. The bores 60 register with the bores 36 through the expandable mounting members to provide a central recess in the device 10 through which the sheaths 28 and 28' may be connected to the external monitoring circuits (not shown).

As stated previously, the frustoconical surface 56 of the spacers 48 and 48' are overlapped by the lower ends 32 of the expandable mounting members 24 and 24', respectively, for a predetermined distance. Overlap of the spacers 48 and 48' by the expandable mounting members 24 and 24' is accomplished until the members are nested, and the expandable members 24 and 24' have been expanded into an abutting relationship with the bore 12. A partial overlap of members may be made externally to the bore 12 before the device 10 is inserted thereinto, or the members may be individually inserted without preliminary overlap. The bore 12 is machined so as to receive the nested, overlapped arrangement which comprises the device 10.

Once inserted into the bore 12, the force-applying plug 50 is threaded thereinto. Threading the plug 50 into the bore 12 has the effect of imposing a force, directed along the axis of the axis of the device 10, into each of the nested expandable mounting members and the overlapped spacers. These expandable mounting members 24 and 24' respond to the axial force exerted thereon by the plug 50 and transmitted thereinto by the spacer members 48 and 48' by sliding relative to the spacer members 48 and 48' in a direction tending to cause a greater degree of overlap between the frustoconical surfaces 46 and 56. Thus, in response to a force directed along the axis of the device 10 and illustrated by an arrow 62, the overlapping ends of the expandable members 24 and 24' slide relative to the overlapped ends of the spacers 48 and 48'. Overlapping a greater frustoconical surface 56 of the spacer members 48 and 48' tends to exert a substantially radial force (relative to the axis of the device 10) which forces the mounting members 24 and 24' to expand in a substantially radial direction, as illustrated by the arrow 64. Expanding the mounting members 24 and 24' in the direction 64 will dispose the thermocouple sensing elements 23 and 23' into an abutting and temperature sensing relationship with the points 18 and 20 which lie along the line of interest 16 within the body 14. Of course, any suitable means 25 to expand the mounting members having the thermocouple sensing elements 23 and 23' thereon and dispose these elements 23 and 23' in a temperature sensing relationship with the body 14 is within the contemplation of this invention.

It may be appreciated that the device 10 embodying the teachings of this invention overcomes all of the disadvantages of the prior art. The thermocouple junction sensors 26 and 26' are electrically isolated and thus are effectively shielded from extraneous electric currents. The thermocouple junction sensors 26 adn 26' and the insulation 27 and 27' are protected by a rugged metallic sheath made from a suitable material. The body 14, whose temperature is being measured, is therefore not distorted by unfilled voids which surround the prior art thermocouples. Also, the device embodying the teachings of this invention is easy to manufacture and fabricate.

It is thus seen that a temperature measuring device embodying the teachings of this invention is a novel, useful and unobvious device for measuring the temperature at a predetermined number of points along a line of interest in a body member. Disposing the temperature sensing elements on expandable mounting members, with one element for each point of interest, and expanding the mounting members by suitable means to dispose the elements in an abutting and temperature sensing relationship with the body provides accurate and reliable temperature readings from each point of interest.

We claim:

1. A device for measuring temperatures at a predetermined plurality of points along a line of investigation within a body, said device comprising:

a plurality of temperature sensors, each of said plurality of sensors corresponding to one of said predetermined points, a plurality of expandable mounting members, each mounting member having a first end and a second end thereon, each mounting member having one of said sensors mounted thereon, and, a plurality of spacer members disposed so that each first end and each second end of each of said plurality of expandable mounting members is adjacent to one of said spacers, said spacer members adapted to translate a force exerted along an axis extending through said device into a force directed radially outward relative to said axis, said spacer members also adapted to impress said radially outward directed force into each of said plurality of expandable mounting members to expand said mounting members in a radially outward direction to dispose said sensors in a temperature sensing relationship with said body.

2. The device of claim 1, wherein one of said sensors comprises a thermocouple junction.

3. The device of claim 2, wherein each of said thermocouple junctions is disposed within a sheath, each of said junctions being electrically isolated from said sheath, and, wherein expansion of said expandable mounting member disposes said sheath in an abutting relationship with said body.

4. The device of claim 1, wherein:

each of said first ends of said expandable members is disposed so as to overlap a predetermined portion of the spacer member adjacent said first end, each of said second ends of said expandable members is disposed in abutting contact with said spacer member adjacent said second end, said spacer members transferring a force imposed thereon in a direction along an axis extending through said device into each of said expandable members, each of said expandable members responding to said force imposed thereon by displacing in a direction tending to overlap a greater portion of said spacer member adjacent said first end, said displacement of said expandable members relative to said spacer members adjacent said first end so as to overlap said greater portion of said spacer member causing said expandable member to expand in said direction radially outward relative to said axis to dispose said sensor in said temperature sensing relationship with said body.

5. The device of claim 4, wherein each end of said spacer member overlapped by said first end of said expandable member has a frustoconical surface area thereon.

6. The device of claim 4, wherein:

each of said sensors is a thermocouple junction, each of said thermocouple junctions is disposed within a metallic sheath, said junction being electrically isolated from said sheath, wherein a central cavity extends through said device, each of said sheaths extending through said central cavity.

7. The device of claim 1, wherein one of said sensors comprises a resistance-temperature detector.

8. A device for measuring temperatures at a predetermined plurality of points along a line of investigation within a body, said device comprising:

a plurality of temperature sensors, each sensor corresponding to a predetermined point and each disposed within and electrically insulated from a metallic sheath, a plurality of expandable mounting members each having a central cavity therein, said expandable mounting members comprising a substantially cylindrical member with a first and second end and having a slit extending completely along the length thereof and an opening therein, each mounting member having a sensor mounted on the outer surface of said slit cylindrical member adjacent said first end thereof, each of said sheaths of each sensor extending through said opening in each slit cylindrical member into said central cavity therein, and, means for expanding each of said expandable mounting members to dispose said sensors in a temperature sensing relationship with said body, said expanding means comprising:

a plurality of spacer members being disposed so that each first end and each second end of each of said expandable members is adjacent to one of said plurality of spacer members, each of said first ends of said expandable members being disposed so as to overlap a predetermined portion of the spacer member adjacent said first end, each of said second ends of said expandable members being disposed in abutting contact with said spacer member adjacent said second end, said spacer members transferring a force imposed thereon in a direction along an axis extending through said device into each of said expandable members, each of said expandable members responding to said force imposed thereon by displacing in a direction tending to overlap a greater portion of said spacer member adjacent said first end, said displacement of said expandable members relative to said spacer members adjacent said first end so as to overlap said greater portion of said spacer member causing said expandable member to expand in a direction radially outward relative to said axis to dispose said sensor in said temperature sensing relationship with said body.

9. The device of claim 8, wherein said slit cylindrical members and said spacer members are fabricated of the same material as said body.

10. The device of claim 8, wheren one of said sensors comprises a resistance-temperature detector.

11. The device of claim 8, wherein one of said sensors comprises a thermocouple junction.

* * * * *